No. 702,926. Patented June 24, 1902.
M. CORRINGTON.
AUTOMATIC FLUID PRESSURE BRAKE APPARATUS.
(Application filed Oct. 26, 1901.)
(No Model.) 3 Sheets—Sheet 2.
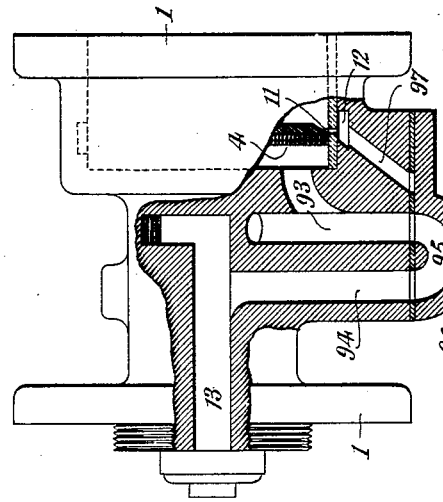
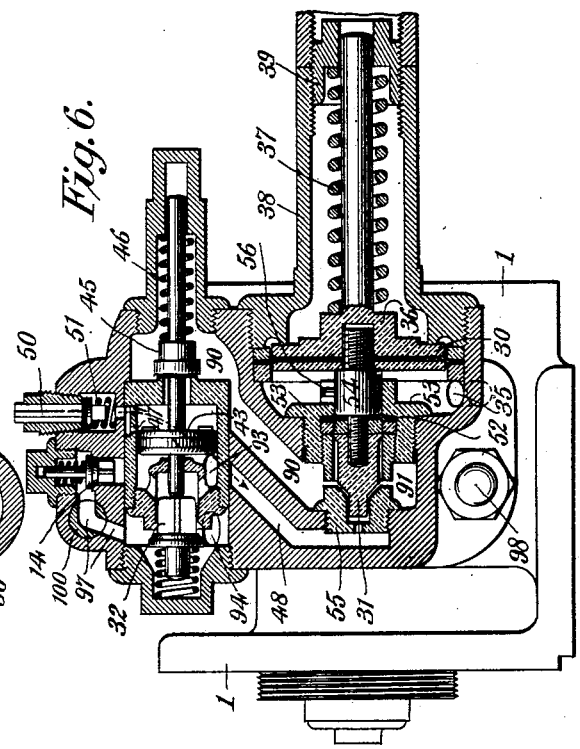
WITNESSES:
C. E. Ashley
Mau. ce Spillane
INVENTOR
Murray Corrington No. 702,926. Patented June 24, 1902.
M. CORRINGTON.
AUTOMATIC FLUID PRESSURE BRAKE APPARATUS.
(Application filed Oct. 26, 1901.)
(No Model.) 3 Sheets—Sheet 3.
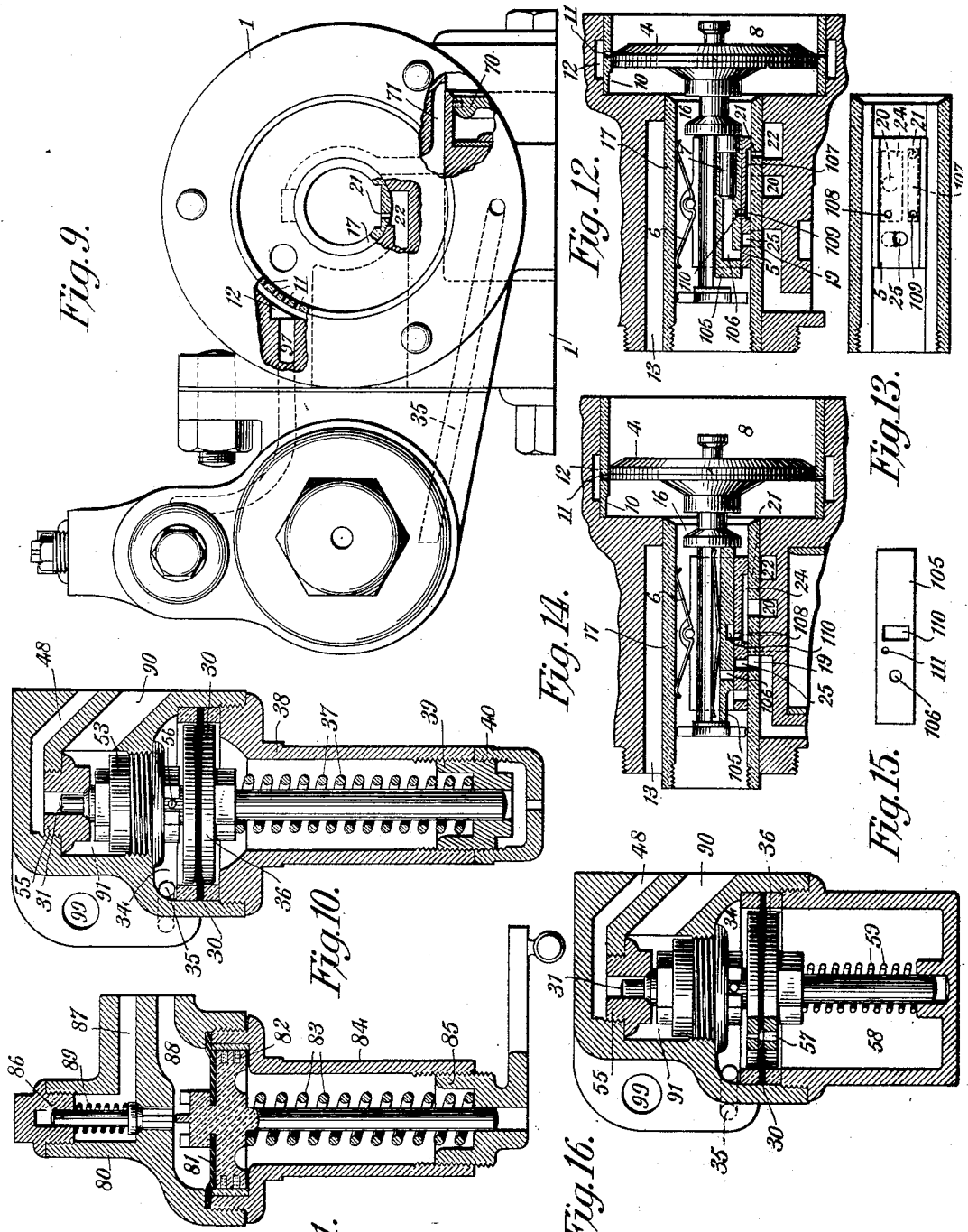
WITNESSES: C. E. Ashley, Mau. Spillane
INVENTOR. Murray Corrington

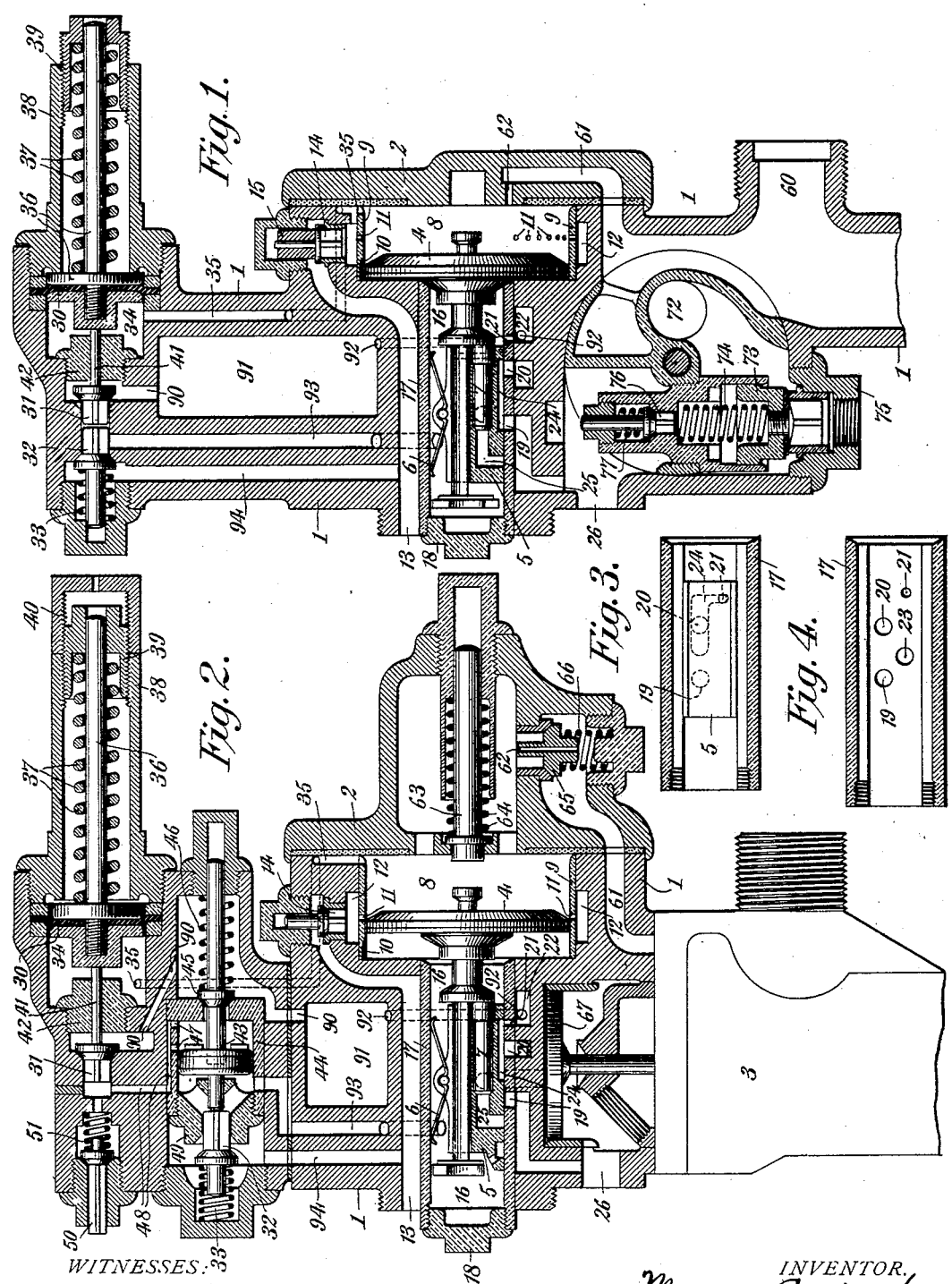

UNITED STATES PATENT OFFICE.

MURRAY CORRINGTON, OF NEW YORK, N. Y.

AUTOMATIC FLUID-PRESSURE BRAKE APPARATUS.

SPECIFICATION forming part of Letters Patent No. 702,926, dated June 24, 1902

Application filed October 26, 1901. Serial No. 80,028. (No model.)

*To all whom it may concern:*

Be it known that I, MURRAY CORRINGTON, a citizen of the United States, residing at New York city, in the county and State of New York, have invented certain new and useful Improvements in Automatic Fluid-Pressure Brake Apparatus, of which the following is a specification.

My invention relates to improvements in automatic fluid-pressure brake mechanism such as are now in general use, and more particularly on the cars of steam-railroads, but such as may be used on any railway-vehicles. The general nature of my improvements may be defined as mechanism for effecting the recharging of the auxiliary reservoirs upon the cars while the brakes are applied and afterward releasing the brakes with certainty when desired instead of releasing the brakes as a necessary preliminary to recharging the reservoirs.

A few general considerations will enable my invention to be more easily understood.

There have heretofore been in use on railroad-cars two systems of brakes operated by compressed air. The first is what is known as the "direct-air" system, and the other is what is known as the "automatic" system. The difference between the two is, that in the former the train-pipe running throughout the train and the brake mechanism under the cars is kept normally at atmospheric pressure, and the brakes are applied by the engineer on the locomotive admitting compressed air into the train-pipe and thence to the brake-cylinders and released by exhausting the air from the train-pipe and cylinders. In the automatic system the train-pipe and an auxiliary reservoir on each car is kept normally charged with air under a definite pressure, usually about seventy pounds per square inch, and the engineer applies the brakes by venting the air from the train-pipe and releases the brakes by recharging compressed air into the train-pipe. The two systems are therefore diametrically opposite in their modes of operation and in the results that follow from admitting compressed air into and venting it from the train-pipe.

In the automatic system a valve device is arranged on each car in conjunction with the train-pipe, auxiliary reservoir, and brake-cylinder, usually known as a "triple" valve device, whose purpose is to control the flow of compressed air from train-pipe to auxiliary reservoir, from reservoir to brake-cylinder, and from brake-cylinder to the atmosphere. When compressed air is charged into the train-pipe, it drives the triple valve into its normal position, in which a charging-port is opened for admitting compressed air from the train-pipe into the auxiliary reservoir, while at the same time the release-passage from the brake-cylinder to the atmosphere is opened. When it is desired to apply brakes for ordinary or service stops, the train-pipe pressure is reduced gradually, which causes the compressed air in the auxiliary reservoir to shift the triple valve into a position to close both the charging-passage from train-pipe to reservoir and the release-passage from brake-cylinder to atmosphere and at the same time to open a passage from auxiliary reservoir to brake-cylinder, thus admitting reservoir-pressure to the cylinder, which forces the brake-piston outward and applies the brake-shoes to the wheels through the usual arrangement of levers.

While the train is running with the brakes off, provision is made for automatically supplying, from the air-pump and main reservoir on the locomotive, any leakage of compressed air from the train-pipe and brake mechanism on the cars, so that the system is kept automatically charged at the definite normal pressure. As quickly as the brakes are applied it is with all the apparatus now in use no longer possible to supply such leaks of compressed air as there may be from the system, because of the danger of releasing the brakes whenever any compressed air is admitted into the train-pipe. It is found to be universally true in practice that after the brakes have been set for a short time, which will vary according as the leakage from the system is greater or less, it is necessary to recharge the auxiliary reservoirs on the cars in order to make the brakes longer effective, and with the apparatus now in use this can only be done by moving the triple valve into release position, thereby taking off the brakes entirely while the auxiliary reservoirs are being recharged for further application.

Various attempts have heretofore been made to devise a practicable means for setting the brakes and, while keeping the triple valve in the brake-setting position, for recharging the auxiliary reservoirs without releasing. These attempts have usually taken one of two forms, either to open a port from the train-pipe to the brake-cylinder directly, while keeping the triple valve in position to close the exhaust-passage from the brake-cylinder, or to open a passage from the train-pipe to the auxiliary reservoir and thence to the brake-cylinder through the passage usually employed for admitting reservoir-air to cylinder. These attempts, which really amount to converting the automatic into the direct-air system, have been abandoned as impracticable, very obvious objections being that it is impossible to release and that it is also impossible to recharge the train-pipe or the reservoir with any pressure without raising the pressure in the brake-cylinder to the same extent. Certain suggestions have also been made looking to the recharging of the reservoir without at the same time charging the brake-cylinder; but all such suggestions have proven notorious failures, because, if for no other reason, no practicable plan has been devised for certainly effecting the release of the brakes so long as the smallest port is opened or even a slight leakage of air is permitted between train-pipe and reservoir while the triple valve is in position for setting brakes.

My improvements herein illustrated and described are intended to enable the engineer to apply the brakes after first charging the train-pipe and auxiliary reservoir on each car to the normal pressure, then while the triple valve is in the brake-setting position to recharge the auxiliary reservoir, readmit pressure from the reservoir to the brake-cylinder as the pressure in the cylinder shall leak away or as it may become necessary to apply the brakes with greater force, then again recharge the reservoir, again admit pressure to the cylinder, and repeat these operations as long as desired, keeping the brakes continuously set all the while, and finally to release the brakes with certainty when desired. It will be understood that I propose to retain the automatic system of operation always without converting the system to the direct-air system, so that the brakes shall always be applied by first admitting the train-pipe air into the auxiliary reservoir while the communication between reservoir and brake-cylinder is closed, and then admitting the compressed air from the auxiliary reservoir to cylinder through a reduction of the train-pipe pressure. By preference I have preferred to illustrate and describe my improvements in connection with and as applicable to the ordinary well-known types of triple valve, as I shall presently herein explain at length.

In some of the figures of the drawings I have shown the whole mechanism, including my improvements and the triple valve, as being located to operate within chambers of the same casing. In other figures all or very nearly all of the additional mechanism which I employ to accomplish the additional results I have shown as being placed in an attachment to be bolted by appropriate provisions upon the casing of the triple valve.

Referring to the drawings, Figure 1 is a vertical section of a triple valve and its casing, showing in the same section a representation of additional mechanism for accomplishing the results described operating in an extension of the same casing. Fig. 2 is a similar section of a slightly-different type of quick-acting triple valve and its casing, showing a modified form of my improvements, the principal part of the new mechanism being placed in a separate casing which is to be fastened appropriately to the upper side of the triple-valve casing. Fig. 3 is a plan of the main slide-valve and valve-seat of Fig. 1. Fig. 4 is a plan of the main-slide-valve seat of Fig. 2. Fig. 5 is a plan of the main body of the same triple-valve construction as that illustrated in Fig. 2, with the exception that it is intended that the attachment containing the new mechanism is to be bolted onto the side of the triple casing instead of the side plate illustrated in said figure, a portion of the casing being broken away in order to illustrate certain ports and passages. Fig. 6 is a vertical section through the attachment, called for convenience the "recharge-release attachment," containing the new mechanism for accomplishing the new recharge-release functions and which may be bolted onto the side of Fig. 5 in place of the side plate, as presently to be described. Fig. 7 is a side elevation or outside view of the side of a triple-valve casing ready to have the attachment shown in section in Fig. 6 bolted in place. Fig. 8 is a side elevation or outside view of the side of the recharge-release attachment, such as shown in section in Fig. 6 and which may be readily bolted to the side of a triple-valve casing, such as shown in Figs. 5, 6, and 7, a small portion of the casing being broken away to show the direction of some air-passages. Fig. 9 is a front elevation of one form of triple-valve casing looking through the main piston and main slide-valve chambers and showing the recharge-release attachment held in place upon the side of the casing, certain sections of the casing being broken away to illustrate certain ports and passages. Fig. 10 is a longitudinal partly-sectional view of the lower portion of the attachment shown in Fig. 6. Fig. 11 is a sectional view of one form of a pressure-reducing valve device such as is commonly employed in automatic compressed-air brake systems to control the flow of air from the main reservoir to the train-pipe and to automatically keep the train-pipe pressure at a certain definite normal standard, according to the adjustments of the device, irrespective of variations of pressure in the main reservoir. Figs. 12 to 16, both inclusive, are views illustrating modifications to be fully described hereinafter.

I refer briefly to the difference in the triple-valve constructions shown in Figs. 1 and 2, and shall hereinafter describe them in more detail. Both are quick-acting triple valves. It is well known that there are two general types of quick-acting triple valves, one of which makes the operation of the quick-action mechanism for venting the air from the train-pipe under the car when it is desired to set the brakes in emergencies with maximum rapidity and force dependent upon the movements of the triple valve, while the other makes the operation of the emergency mechanism independent of the movements of the triple valve. In Fig. 1 the emergency mechanism is wholly independent of the prior movement of the triple valve, and hence the triple valve moves the same distance whether the brakes are to be set in what is known as the "service" application, which is customary for all ordinary occasions of applying brakes, or are to be set in quick-action or emergency applications. In Fig. 2 the emergency mechanism depends for its operation upon the prior movement of the triple valve, and hence the triple valve moves through only a portion of its traverse for a service application, while it moves through its full possible traverse to effect an emergency application.

I do not deem it necessary to go into details here regarding the manner of operating the quick-acting or emergency mechanism in connection with the triple valves illustrated. The type of quick-acting mechanism shown in Fig. 1 is the same substantially as that fully illustrated and described in United States Letters Patent No. 616,288, issued to me December 20, 1898, while the quick-action mechanism of Fig. 2 is substantially the same as that illustrated and described in my United States Letters Patent No. 636,954, issued to me November 14, 1899. I have preferred to show my improvements in connection with two types of quick-acting triple valve rather than confine myself to one type merely for the purpose of emphasizing the fact that my improvements are applicable to any ordinary type of triple-valve construction.

I refer first to Fig. 1, which I have made as a diagrammatic representation of the main features of my invention for the purpose of enabling it to be the more readily understood rather than as a preferred construction for practical use. The figure includes a main casing 1 and a smaller casing or cap 2. The triple valve proper embraces a piston 4, a slide-valve 5, a slide-valve spring 6, and a graduating-valve 7, controlling the graduating-port 25 in the slide-valve, these being the usual parts of an ordinary triple valve. The piston 4 moves in a chamber 8, which is provided with a bushing 9. What is commonly known as a "charging" groove or passage 10 is made in the bushing 9 at the upper left-hand corner of chamber 8, so as to be opened by the piston 4 in its normal or release position shown in Fig. 1, through which air may be charged into the auxiliary reservoir. Another port or series of ports 11 opens through the bushing 9 into a cavity 12, which by preference is cored in the casing around said bushing, the purpose of said ports being to recharge the auxiliary reservoir while brakes are applied. From the cavity 12 a passage 13 leads to the auxiliary reservoir past the check-valve 14, which may, if desired, be held to its seat by a load, such as a weight 15. The slide-valve 5 moves within a chamber 16, which has a bush 17, the end of which is closed by a cap 18. Through said bushing on its under side is the port 19, leading to the brake-cylinder through passage 26, the port 20, leading to the atmosphere, and the port 21, which normally connects the triple-valve chamber 16 with the cavity 22. The slide-valve 5 has on its face a main cavity 24, normally holding the brake-cylinder at exhaust through ports 26, 19, and 20. The ports 19, 20, and 21 and the cavity 24 are shown in dotted lines in Fig. 3. The port or passage 19 is usually called the "service" port or passage, and the port 20 is usually called the "exhaust-port." In the upper portion of the casing is shown a diaphragm 30 and two valves 31 and 32, the latter being held in closed position by the spring 33. On one side of the diaphragm 30 it is exposed to fluid under pressure in the chamber 34, admitted thereto through the passage 35, which is preferably normally open to the train-pipe. The right-hand side of the diaphragm 30 is backed up by a disk or piston 36, against which bears a spring 37, inclosed in a box 38 and having its force or tension regulated by the adjusting-nut 39, which in turn may be covered and locked by a cap-nut 40, as seen in Fig. 2. A stem 41, by which the valve 31 may be operated, extends through an air-tight bushing or a stuffing-box 42. Controlled by the valves 31 and 32 are three passages—first, the passage 90, leading into the cavity or chamber 91 and thence continuing by the passage 92, shown in dotted lines, to the cavity 22 and thence by the port 21 into the triple-valve chamber; second, the passage 93, leading into the chamber 16, as shown partly in dotted lines, and, third, the passage 94, leading into the auxiliary-reservoir passage 13. The nozzle 60 is normally connected to the train-pipe, and thence a passage 61 and 62 leads to the chamber 8.

The operation of the mechanism is as follows: When air is charged into the train-pipe through the engineer's valve on the locomotive, it enters the triple valve device through the branch train-pipe by the nozzle 60 and goes thence by the passages 61 and 62 into the piston-chamber 8. Supposing the triple valve is in the position shown in Fig.

1, the air passes through the charging-port 10 into the chamber 16 and goes thence by the ports and passages 21, 22, and 92 into the chamber 91. The air also goes from the chamber 16 through the passage 93, past the check-valve 32, through the passage 94 to the auxiliary-reservoir passage 13, and charges the auxiliary reservoir to the normal pressure. At the same time the train-pipe air entering the chamber 8 goes through the ports 11 to the cavity 12 and thence past the check-valve 14 and through passage 13 to the reservoir, provided the pressure is sufficient to lift said check-valve with its load. Again, the air entering the chamber 8 goes freely by the passage 35 into the chamber 34, where it tends to move the diaphragm 30 to the right against the spring 37.

The condition of the mechanism in Fig. 1 supposes that the system, including the train-pipe, the valve-chambers, and the auxiliary reservoir, is charged with compressed air at the normal working pressure, which we assume is about seventy pounds pressure per square inch. The spring 37 is adjusted to balance a pressure against diaphragm 30 at or a little below the normal working pressure, preferably about sixty-eight or sixty-nine pounds per square inch. In the particular construction shown in Fig. 1 it will be noticed that a communication is open between the passage 35 and the cavity 12 at the upper side of the bushing 9, the purpose of which will be presently explained.

Supposing the system already charged, as above explained, the train-pipe pressure is gradually reduced. The pressure in 34 will decline at the same time, the air flowing out through the passage 35 and the chamber 8. Under ordinary conditions it requires a reduction of six to eight pounds in the train-pipe pressure, or from seventy to sixty-two or sixty-four pounds in order to move the triple valve to the brake-setting position. This reduction of pressure in train-pipe causes the piston 4 to first open the valve 7 and then move to the right of the ports 11, drawing the valve 5 to the right until the port 25 registers with the port 19 leading to the brake-cylinder. This reduction of pressure in train-pipe is sufficient to permit the spring 37 to move the diaphragm 30 to the left, and thus seat the valve 31 and open the valve 32 against the spring 33, which may be just strong enough to seat the valve 32 when the valve 31 moves out of the way. The position occupied by the slide-valve 5 in this operation of the triple valve is shown in Fig. 3, in which the cavity 24 no longer connects the ports 19 and 20, but connects the ports 20 and 21. In Fig. 1 the ports 19, 20, and 21 are shown in the same line for the sake of easier explanation. As the cavity 24 connects ports 21 and 20, the air in the passages and cavities 90 91 92 22 is exhausted through the ports 21, 24, and 20, so that those cavities and passages are open to the atmosphere. The valve 31 having been seated, however, by the movement of the spring 37, no air can flow out of the passage 93; but, on the other hand, the valve 32 being opened by the same operation reservoir-air flows freely through the passages 13, 94, and 93 into the slide-valve chamber 16 and thence through the service-passages 25 and 19 to the brake-cylinder. The operation just described permits the reservoir-air to flow to the brake-cylinder until the pressure at the left of piston 4 falls slightly below the pressure in the train-pipe, when the latter pressure moves the piston 4 to the left far enough to cross the recharging-ports 11 and close the graduating-valve 7, but leaving the slide-valve 5 in the position to which it was moved by the operation described with port 25, registering with port 19, as shown in Fig. 3. The movement of the piston 4 to the brake-setting position carries it to the right of the ports 11. In moving to the left to close the graduating-valve 7, as just described, the packing-ring of the piston moves across the ports 11, so as to place them on the right-hand or train-pipe side of the piston. Further reductions of train-pipe pressure may be made as desired, which again moves the piston 4 across the ports 11 to the right and opens the graduating-valve 7, admitting more pressure from the auxiliary reservoir through passages 13, 94, 93, 25, and 19 to the brake-cylinder.

When it is desired to recharge the auxiliary reservoir, the train-pipe pressure is gradually increased by admitting compressed air thereinto through the engineer's valve, which flows into the chamber 8, thence through the ports 11, past the check-valve 14, and thence by the passage 13 to the auxiliary reservoir. This pressure may be increased as desired, care being taken not to raise the pressure high enough in the passage 35 and chamber 34 to move the diaphragm 30 and open the valve 31. The reservoir having been recharged to the desired pressure, the train-pipe pressure may again be lightly reduced, which, as before, moves the piston 4 to the right of ports 11, opens the graduating-valve 7, and admits more reservoir-pressure to the brake-cylinder. These operations may be continued until the reservoir-pressure is sufficiently reduced, when the pressure therein may again be replenished by charging the compressed air into the train-pipe and thence past the valve 14 through the passage 13 to the reservoir. These operations may be repeated as long as desired, recharging the auxiliary reservoir and keeping the brakes set for any desired length of time. When it is desired to release the brakes, the triple valve being in the position as described and the main slide-valve as shown in Fig. 3, so that the chamber 91 and cavity 22 are open to the atmosphere, air is admitted into the train-pipe by the engineer until the pressure in chamber 34 is sufficient to force the diaphragm 30 to the right, compressing the spring 37 and opening valve 31 and closing valve 32, as shown in Fig. 1. This movement of said diaphragm and valves closes communication between passages 94 and 93—that is to say, between the auxiliary reservoir and the triple-valve chamber—while at the same time the passage 93 is opened to the passage 90 and chamber 91 and thence to the atmosphere by the ports and cavities 92, 22, 21, 24, and 20, as shown in Fig. 3. The compressed air in the triple-valve chamber at the left of the piston 4 will therefore be exhausted through said passages, cavities, and ports, while at the same time communication between the auxiliary reservoir and the triple-valve chamber is closed. This operation causes the piston 4 and the valves 5 and 7 operated thereby to move to the left into the position for releasing brakes shown in Fig. 1, in which the brake-cylinder passage 19 is opened to the exhaust-port 20 by the cavity 24.

I have described the operation as though the recharging of the reservoir was accomplished solely through the ports 11, which are located in position to compel the closing of the graduating-valve 7 before or at the instant of opening the recharging-passage from the train-pipe. In the particular construction shown in Fig. 1 another means is shown by which the reservoir can be recharged and at the same time compel the closing of the passage from reservoir to brake-cylinder before opening the passage from train-pipe to reservoir. Supposing the ports 11 are closed and communication is opened between the passage 35 and cavity 12, as illustrated, so that the train-pipe air can always get to the under side of check-valve 14. In this event the load 15 is so adjusted that it will hold the valve 14 closed against the preponderance of train-pipe pressure necessary to move the piston 4 to the left and close the graduating-valve 7, which, we will assume, is about one pound, while it will yield and permit the valve 14 to rise and permit the compressed air to flow to the reservoir before the train-pipe pressure preponderates sufficiently to move the triple valve to release position. We may assume that a preponderance of three pounds in train-pipe pressure would be sufficient to move the triple valve to release position, while a preponderance of one pound would be sufficient to merely cause the piston 4 to close the graduating-valve 7. In such case the load upon the check-valve should be sufficient to balance a preponderance of pressure of about two pounds per square inch on the under side of the valve. I have illustrated in Fig. 1 both these means for compelling the closing of the passage from reservoir to brake-cylinder before opening the recharging-passage from train-pipe to reservoir, because they are capable of conjoint operation and both may be employed in the same structure, if desired.

Going now to Fig. 2, its mode of operation and its differences of construction from Fig. 1 will be readily understood. The triple-valve chamber 8 is longer than in Fig. 1, and the triple valve moves through only a portion of its chamber in the service operation to cause the port 25 in the slide-valve to register with the port 19, in which position the piston 4 rests against the stop 63, which is backed up and held in place by the spring 64. The recharging-ports 11 and the check-valve 14, seated in this case by its own gravity, operate as described.

As the mechanism was described to operate in Fig. 1, the packing-ring of the piston 4 moved across the ports 11 to alternately open and close them to the train-pipe as the graduating-valve 7 was alternately closed and opened. It might happen in Fig. 1 that the piston after opening the graduating-valve 7 to admit the air through the port 19 would move to the left far enough to partly open the ports 11, but without bringing the valve 7 wholly to its seat. In this case if air were gradually admitted to the train-pipe in recharging the auxiliary reservoir it would go through the ports 11, and thence to the auxiliary reservoir, and thence into the triple-valve chamber and past the valve 7, through the ports 25 and 19 to the brake-cylinder, so that the brake-cylinder pressure would be increased to the same extent as that in the train-pipe. To avoid such happening, the triple valve in Fig. 2 is given a little longer range of motion for the service application. The port 25 in the slide-valve controlled by the valve 7 registers with the port 19, as before in Fig. 1. When the pressure at the left of the piston in expanding to the brake-cylinder drops sufficiently for the piston 4 to move to the left and close valve 7, the piston 4 does not in closing said valve move across the ports 11, but stands at the right hand of said ports. Then when the train-pipe pressure is increased for recharging the auxiliary reservoir it moves the piston 4 and slide-valve 5 far enough to the left, so that the port 25 in the slide-valve passes beyond the port 19 before the packing-ring of the piston 4 crosses the ports 11, as fully illustrated in Fig. 2. There can therefore be no danger whatever of air going to the brake-cylinder when it is charged through the ports 11 to recharge the auxiliary reservoir. When it is desired to admit more air to the brake-cylinder, the train-pipe pressure is lowered sufficiently not only to open the valve 7, but also to move the slide-valve to the right to cause the port 25 to register with the port 19. It will be understood that in moving the slide-valve to the left to the position shown in Fig. 2 the exhaust-cavity 24 does not connect the port 19 with the exhaust-port, the escape of train-pipe air through the ports 11 causing the piston 4 to stop in the position shown.

The ports in the main-valve seat of Fig. 2 are shown in Fig. 4.

In Fig. 1 provision is made in the small port 62 for admitting the train-pipe air gradually to the chamber 8, when it is desired to recharge the reservoir without forcing the triple valve to release position. In Fig. 2 the same provision is made for admitting train-pipe air to the chamber 8 very gradually through the small port 62, made in the check-valve 65, which may be held normally closed by the light spring 66. This construction enables the air to be admitted very gradually into the chamber 8 in recharging and also to be rapidly vented from the chamber 8 when the mechanism is to be operated for an emergency application.

A modification is likewise made in the release apparatus of Fig. 2. The arrangement of the diaphragm 30, valve 31, bushing or stuffing-box 42, and the air-passage and chamber 35 and 34 is essentially the same as in Fig. 1; but instead of operating the valve 32 directly by the movement of the valve 31 a small piston 43 is inserted in a suitable bushing 44 to operate the valves 32 and an additional valve 45, which is held normally closed by a spring 46, the movement of the piston 43 and the two valves operated thereby being in turn controlled by the valve 31.

The condition of the parts in Fig. 2 assumes that the system has been charged with air and that the train-pipe pressure has been reduced and the brakes set for the desired length of time and that the mechanism is now ready to have the train-pipe charged to effect the release. It will be remembered that the passages and cavities 90, 91, 92, 22, and 21 are at atmospheric pressure in this condition of the apparatus. The piston 43 is normally balanced between equal pressures equivalent to that in the auxiliary reservoir and is kept so balanced during the whole time of setting the brakes and recharging the reservoirs, any irregularity in pressure being supplied by leakage past the piston. As the pressure through passage 35 is increased to sixty-eight to seventy pounds, according to the adjustment of the spring 37, it forces the diaphragm 30 to the right and unseats the valve 31. The pressure in the chamber of the piston 43 at the right of said piston is thereupon vented through the ports 47, the passage 48, past the valve 31, into the passage 90 and cavity 91, and thence through the passages 92, 22, 21, 24, and 20 to the atmosphere until the pressure at the right of the piston 43 is dropped sufficiently to cause the piston to start to the right and unseat the valve 45 against the spring 46. As soon as the valve 45 is unseated any remaining pressure in the piston-chamber escapes past said valve into the passage or cavity 90 and 91 and completes the unbalancing of piston 43, which thereupon goes by an instantaneous movement to the right-hand end of its chamber and stands between the two ports 47. At the same instant the spring 33 moves the valve 32 to its seat in the cap 49, which closes the end of the chamber of the piston 43, said valve controlling the air-passage through said cap. In the normal condition of the apparatus and while the brakes are being set the air from the reservoir-passage 13 flows through the passage 94, through the cap 49, past the valve 32, thence by the passage 93 to the triple-valve chamber. As quickly as the piston 43 moves to the right-hand end of the chamber and the valve 32 is seated, as just described, communication between the passages 94 and 93—that is, between the auxiliary reservoir and the triple-valve chamber—is cut off, while at the same time communication from the triple-valve chamber to the atmosphere is opened through the passage 93, thence upward through one of the ports 47, thence to the right and down through the other of the ports 47, around the piston 43, thence past the valve 45 into the passages and cavities 90 91, &c., to the atmosphere. This reduction of pressure at the left of the piston 4 causes its quick movement to the left end of the chamber 8, which is the normal or release position of the triple valve, in which the cavity 24 connects the passage 19 with the exhaust-port 20, which is the position shown in Fig. 1. By the same movement of the triple valve the port 21 is again opened to the chamber 16, and air then flows through ports and cavities 21 22 92 91 90 to the chamber of piston 43, rebalancing it and permitting spring 46 to move the piston to the left, thus closing valve 45 and opening valve 32. The reservoir having been already recharged, the brakes may be immediately reset.

It will be understood from the description that when the apparatus stands in the position shown in Fig. 2 anything which unbalances the piston 43 and causes it to move to the right-hand end of its chamber will release brakes through the opening of the triple-valve chamber to the atmosphere, while at the same time closing the said chamber to the auxiliary reservoir. I have illustrated at the upper left-hand corner of the figure a mechanism consisting of the valve 50 and spring 51 for effecting the manual release of the brakes. It is apparent that if the valve 50 is opened air will escape from the chamber at the right of the piston 43 through the ports 47, the passage 48 past the valve 50, causing the piston 43 to move to the right-hand end of its chamber and stand between the two ports 47, at the same time closing the valve 32, thus venting the air from the triple-valve chamber through the ports and passages, as already described, while at the same time closing said chamber to the auxiliary reservoir and causing the triple valve to move to the left into release position.

The figures of the drawings from 5 to 9, both inclusive, will now be readily understood. The mechanism in these figures has been so arranged that all of the apparatus necessary to accomplish the new results of recharging the auxiliary reservoir while the brakes are applied and afterward releasing brakes with certainty is placed in an attachment which is bolted upon the side of the triple-valve casing. In Fig. 5 the passage 13, leading to the auxiliary reservoir, communicates with the passage 94, which leads out of the casing of the triple valve, and thence with the passage 93 by way of the passage 95 through the side plate 96. The port 11 and cavity 12 communicate with the passage 97, which likewise leads out through the triple-valve casing. Fig. 7 shows in elevation the position of the ports 93, 94, and 97 coming out of the triple casing. It also shows the passage 35 coming out of the triple casing. A portion of the cavity 91, as well as the passage 92, is likewise shown. Two bolts 98 are in position on which the bolt-holes 99 in Fig. 8 are fitted when that figure is turned end about and moved down to be bolted into place on Fig. 7. It will be understood that with the construction illustrated in these figures a portion of the cavity or chamber 91 is in the triple-valve casing and a portion is in the casing of the attachment.

Figs. 6 and 9 show the attachment bolted in place on the side of a triple casing. One of the advantages of the construction illustrated in the figures now being described is that I may make a triple valve without any additional parts and have it operate just as the triple valves now in general use operate—that is, by first setting the brakes and then releasing each time before recharging the auxiliary reservoir—or I may operate the same mechanism to set the brakes and then recharge the auxiliary reservoir before releasing and afterward release with certainty, the difference in operation depending solely on whether I have the side plate 96 (shown in Fig. 5) or the recharge release attachment (shown in Fig. 8) bolted in place upon the side of the triple casing. When the side plate 96 is bolted on, as shown in Fig. 5, the train-pipe air going through the ports 11, 12, and 97 can get no farther, because the passage 97 is effectively closed by the plate 96. The communication between the auxiliary reservoir and the triple-valve chamber is, however, freely open through the passages 13, 94, 95, and 93, the latter of which may, if desired, enter the triple chamber by either of two branches, as shown. With this construction we rely, of course, upon the ordinary charging-groove 10 of Figs. 1 and 2 for recharging the reservoir, which is only opened when the triple valve moves to release position.

The direction of the ports and passages and the operation of the mechanism may be readily understood from an inspection of Figs. 5 to 9, inclusive. The train-pipe air goes into the piston-chamber of the triple valve in the usual manner. Communication between reservoir and triple-valve chamber has already been pointed out in Fig. 5. In Fig. 7 port 94 leads to auxiliary reservoir and port 93 to the triple-valve chamber. The corresponding ports of Fig. 8 match these ports when the latter figure is turned about and bolted in place upon Fig. 7. The entrance of the two ports 94 and 93 into the attachment on opposite sides of the valve 32 is also shown in Fig. 6. When Fig. 8 is attached to Fig. 7, all the ports 91, 93, 94, 97, and 35 of the two figures meet, so as to form continuing passages. Any air admitted to the triple-valve chamber corresponding to the left side of the piston 4 in Figs. 1 and 2 flows out through the passage 93 toward the observer, Figs. 6 and 7, away from the observer, Fig. 8, then past the valve 32 to the left, Fig. 6, and out of the attachment through the passage 94, away from the observer, Fig. 6, toward the observer, Fig. 8, thence into the passage 94, Figs. 5 and 7, were the attachment bolted upon those figures, and thence to the reservoir. The passage of air through the triple casing and the attachment for recharging is shown in these figures likewise. In Fig. 5 the piston 4 is shown in position for opening the recharging-ports 11. The air will flow through these ports into the cavity 12, thence through the passage 97 in the triple casing, Figs. 5, 7, and 9, thence into the attachment by the continuation of the passage 97, Fig. 8, which passage is shown partly in dotted lines, past the check-valve 14, Figs. 6 and 8, and thence through the passage 94 to the auxiliary reservoir, as heretofore explained. A small cock 100 may be inserted in the passage 97. In case it is turned to close said passage the recharging features of the device will no longer be operative; but the apparatus for releasing will still be operative. The passage 35 for admitting the pressure against the diaphragm 30 is shown in dotted lines going from the triple casing into the attachment in Fig. 9 and is likewise shown in Figs. 6, 7, and 8. When the attachment is removed and the side plate 96 is bolted on, as shown in Fig. 5, the port 35, coming out of the triple casing, as shown in Fig. 9, is closed by the side plate exactly as passage 97 is closed in Fig. 5.

In Fig. 6 a slightly-modified construction over Figs. 1 and 2 is shown for avoiding the use of the air-tight bushing or stuffing-box 42. The construction of the diaphragm 30, the disk 36, spring 37, &c., is essentially the same as in the other figures. Instead of the bushing 42 a small diaphragm 52 is put in place in a box or holder 53, and a coupling-rod 54 is employed to connect the valve 31 with the disk 36, the construction being readily understood from an inspection of Fig. 6. A valve-seat 55 is made for the valve 31, and the parts are all so arranged that by first removing the box 38 all of the different parts may be readily removed for renewals or repairs. A pin 56 in the coupling-rod, moving in a suitable slot in the box 53, permits the coupling-rod 54 to be held while the disk 36 is being screwed onto its outer end.

It will be understood that, as already explained with regard to Figs. 1 and 2, the passages and cavities of Figs. 6, 7, 8, and 9 are at exhaust at the instant that air is charged into the train-pipe for taking off the brakes. As the pressure is increased in the chamber 34 at the left of diaphragm 30, it is evident that the small diaphragm prevents it from passing to the cavity 91. It is also evident that as the pressure moves the diaphragm 30 to the right the small diaphragm 52, and therefore the valve 31, will likewise be drawn to the right, so as to open said valve. The chamber of the small piston 43 at the right thereof is normally in communication with the passage 48 by a groove in the casing, which may be cored through the cut-away portion of the casing, as indicated by the dotted arrow in Fig. 6. Consequently when the pressure in the passage 35 and chamber 34 is increased sufficiently to move the diaphragm 30 to the right and open the valve 31 the piston 43 is unbalanced and moves to the right, opening valve 45, thus permitting the air to escape from the triple-valve chamber through the passage 93 and ports 47 around piston 43, as already explained in connection with Fig. 2, while the valve 32 goes to its seat and closes communication between the passages 94 and 93—that is, between the auxiliary reservoir and triple-valve chamber. The condition of apparatus in Fig. 6 supposes that the pressure has been increased sufficiently to unseat the valve 31 and unbalance the piston 43, which is just ready to begin its movement to the right, but has not yet performed that movement. The valve 50 and spring 51 for manually unbalancing the piston 43 and effecting the release of the brakes are likewise shown in Fig. 6, and their operation is the same as already explained with reference to the corresponding parts in Fig. 2. In Fig. 9 a section of the casing is broken away, so as to show the port and cavity 21 and 22.

At this point I explain briefly the operation of the emergency parts of the apparatus, although this forms no part of my present invention. The type of emergency mechanism of Fig. 1 is the same as that shown in Figs. 7 and 9, in which the piston 70, Fig. 9, is always exposed on the left-hand side to train-pipe pressure and on the right-hand side to auxiliary-reservoir pressure through the passage 71. When the train-pipe pressure is sufficiently reduced for an emergency, the piston 70 moves to the left, opening the port 72, Fig. 1, and permitting the train-pipe air to flow through said port to the under side of the combined piston and valve 73, lifting it up against the spring 74, and flowing thence to the atmosphere through the cap 75. After release of the brakes and the closing of all these ports any remaining pressure above or below the piston 73 may leak off past the check-valve 76, normally closed by the spring 77. All these matters are fully explained in my said prior United States Patent No. 616,288. In Fig. 2 when the train-pipe pressure is sufficiently reduced to cause the triple valve to move through the full traverse of its chamber to the right, a corner of the slide-valve being cut away, air from the reservoir is admitted to the port 23, Fig. 4, thence against the piston 67, forcing it down and opening the emergency-valve to vent the air from the train-pipe, all of which is well-known in the air-brake art and fully explained in my said prior United States Patent No. 636,954. As the operation or construction of the emergency parts of these triple-valve devices forms no part of my present invention and as my present inventions are not intended to affect or modify the operation of the quick-action or emergency mechanisms of triple-valve devices, I do not deem any detailed description of the emergency apparatus necessary.

It is universally known among those skilled in the air-brake art that it is customary under normal conditions while the train is running and the brakes are off to have some kind of an automatic pressure-reducing or pressure-retaining valve device on the locomotive to control the flow of air from the air-pump or main reservoir to the train-line and brake devices upon the cars, so as to automatically keep a certain definite or normal pressure in train-line and auxiliary reservoirs. Fig. 11 shows one of such well-known types of pressure-reducing valves suitable for the above purpose, consisting of a casing 80, a diaphragm 81, a piston 82, a spring 83, box 84, an adjusting-nut 85, a valve 86, controlling passages 87 and 88 and itself normally seated by the spring 89. The passage 87 being connected to the main reservoir or air-pump through a suitable manually-operated cock or valve and the port 88 being connected with the train-line, air flows from main reservoir through the passage 87 on the opening of said cock or valve, thence past the valve 86 and out of the mechanism through the passage 88 to the train-pipe, and thence throughout the train to the various auxiliary reservoirs on the cars. This flow of air continues until the pressure above the diaphragm 81 and piston 82—that is, the train-pipe pressure—is sufficient to overcome the force of the spring 83, whereupon the said diaphragm moves downward and the spring 89 closes the valve 86, thus preventing any further flow of air to the train-line.

Fig. 10 is a view of the lower portion of the release device shown in Fig. 6. It will be remembered that this mechanism is operated to effect the release of brakes, as already explained in connection with Fig. 6, when the pressure in passage 35 and chamber 34 above the piston 30 is sufficient to move said diaphragm 30 down and open the valve 31, thus venting the air in the passage 48 into and through the passage 90, which at the instant of release is open to the atmosphere. It will also be remembered that as the air flows through the passage 88 of the pressure-reducing device, Fig. 11, the pressure is ultimately communicated to the chamber 34, Fig. 10. The mechanism of these two figures (10 and 11) therefore has a coöperative influence in controlling the release or non-release of the brakes, while the passage 87 or the cock or valve manually operated by the engineer between the main reservoir and train-line is left open. We assume that the spring 37 of Fig. 10 is adjusted to open the valve 31, and thus effect the release of the brakes when the pressure in the chamber 34 has reached sixty-eight to seventy pounds. Let us now suppose that the spring 83 of Fig. 11 is adjusted to close the valve 86 at a pressure of sixty to sixty-five pounds above the diaphragm 81—that is to say, in the train-pipe, as illustrated in the drawings. So long as this condition of the two devices remains the same the engineer may open the passage 87 from the main reservoir and allow it to remain open, because Fig. 11 under the conditions supposed will only permit from sixty to sixty-five pounds to flow into the train-line, and this will not be sufficient pressure upon the diaphragm 30 of Fig. 10 to open the valve 31 and release the brakes. Therefore I may with my apparatus as described set the brakes and while so set open communication between the main reservoir and train-line through a pressure-reducing valve, such as Fig. 11, and leave it open indefinitely without any danger of releasing brakes. I will, however, recharge the train-line and auxiliary reservoirs up to sixty or sixty-five pounds, according to the adjustment of the device, and keep this pressure constant and any leaks from train-line or auxiliary reservoirs automatically supplied, exactly as is now done, while the train is running and the brakes are off, the only difference being that instead of keeping the train-line and auxiliary-reservoir pressure automatically supplied at seventy pounds I shall keep the pressure at sixty to sixty-five pounds. When the brakes have been applied as long as desired and we wish to effect the release, we may do so very readily by simply giving the adjusting-nut 85 of Fig. 11 a few turns and increase the pressure of the spring 83, so that it will balance a pressure of seventy or seventy-one pounds above the diaphragm 81. This action will open the valve 86 and permit more air to flow from the main reservoir through 87 and 88, thence into chamber 34, which will force the diaphragm 30 down, opening the valve 31 and releasing the brakes, as already described with regard to the other figures.

Figs. 12, 13, 14, and 15, inclusive, show certain modifications of the triple-valve structure.

Referring again to Fig. 2, let us suppose that by accident the locomotive-engineer has left his valve in such position that the full main-reservoir pressure, which, as is well known, is usually about twenty pounds above the normal pressure in train-pipe and auxiliary reservoir, has been communicated to the train-pipe and reservoir, so that the train-pipe and auxiliary reservoirs have a pressure of ninety pounds instead of seventy, the normal. As the mechanism is constructed in Fig. 2 when the main slide 5 is drawn to the position for setting the brakes the cavity 24 at once connects the ports 21 and 20, thus venting the air from the passages 90, 91, and 92. If we start with ninety pounds in train-line and reservoir, while the spring 37 is adjusted to allow the valve 31 to open with sixty-eight or sixty-nine pounds in chamber 34, the reduction made for setting the brakes from the ninety pounds supposed pressure will not be sufficient to permit the valve 31 to close. The result will be that immediately the triple valve moves back and connects ports 20 and 21 the air in the passages 90, 91, and 92, and therefore in the chamber at the right of piston 43, will be exhausted and the triple valve returned to normal or release position. If further reductions be made, as quickly as the triple valve again moves to the right far enough to connect ports 20 and 21 the brakes will be again immediately released so long as valve 31 remains open, and this valve will remain open so long as the pressure in 34 is sufficient to overcome the force of spring 37. Under the conditions supposed of the main reservoir, pressure being accidentally communicated to the train-pipe and auxiliary reservoir at a much higher point than the normal for train-line, the brakes would not set until the pressure had been reduced below the normal sufficiently to permit the spring 37 to close the valve 31.

Provision is made in the modifications shown in Figs. 12 to 15, inclusive, to provide for the above contingencies. In Fig. 12 a secondary slide-valve 105 is provided in which the valve 7 operates to control a port 106 and which itself moves on top of the main valve 5. The port 106 in the secondary slide registers in brake-setting position with the port 25 in the main valve. The main valve (shown upon its seat in plan in Fig. 13) has two cavities on its face, (shown in dotted lines,) the exhaust-cavity 24 and a second cavity 107. Two small ports 108 and 109 lead, respectively, into these cavities from the top of said valve. The secondary slide has a cavity 110, similar to cavity 110 of Fig. 15, running across its face, which may, however, be narrower than the cavity shown in Fig. 15 and which controls the two ports 108 and 109.

When the pressure is reduced for setting the brakes, the first movement of the piston 4 to the right opens the graduating-valve 7, then moves the slide 105 until the port 106 therein registers with the port 25 in the main valve, and then by a further movement to the graduating position draws the main valve 5 to the position shown in Fig. 12. The left-hand ends of the two slide-valves will in this position be even and both bearing against the wing at the left end of the stem or piston 4, so that the cavity 110 on the face of the slide 105 will be at the right of the two ports 108 and 109 in the main slide-valve, and therefore close both those ports. The main slide will now be in the position shown in Fig. 13, in which the main exhaust-cavity 24 stands over the exhaust-port 20, while the smaller cavity 107 stands over the port 21. As, however, the cross-cavity 110 in the small valve is at the right of the two ports 108 and 109, there can be no communication between the two cavities shown in Fig. 13, and therefore no communication between the ports 20 and 21. Hence the brakes may be promptly set, no matter how high may be the pressure accidentally communicated to the train-pipe and auxiliary reservoir. The triple valve having been moved to the position described for setting the brakes, air now flows from the reservoir to the brake-cylinder until the pressure at the left of piston 4 declines sufficiently to permit the piston to move to the left and close the graduating-valve 7. This movement of the piston does not, however, move the secondary slide 105, which still remains in the position to which it was drawn and keeps the port 106 over the port 25 and the two ports 108 and 109, and therefore the ports 20 and 21, out of communication, and hence there will be no release of the brakes while effecting the graduation. Further reductions of train-pipe pressure may be made and more air admitted from reservoir to brake-cylinder. In this condition of the triple valve the piston 4 will stand at the right of the ports 11 essentially in the position shown in Fig. 14. If, now, it is desired to recharge the reservoir, the train-pipe pressure is increased and moves the piston 4 to the left of the ports 11 and at the same time moves the secondary slide 105 to the left, so that the cavity 110 on its face connects the two ports 108 and 109, and therefore the ports 20 and 21, as seen in Fig. 12. This operation exhausts the pressure from cavity 22 and the passages 90, 91, and 92 in communication therewith and puts the apparatus in condition for releasing the brakes as soon as the engineer has increased his pressure to sixty-eight or seventy pounds, according to the adjustment of the release mechanism. We may therefore provide against the contingency of having the main-reservoir pressure at twenty or more pounds above the normal train-line pressure being accidentally communicated to train-line and auxiliary reservoir and still be able to set the brakes instantly without waiting for any reduction to be effected, care being taken not to attempt the recharging of the auxiliary reservoir with brakes applied until we have reduced the pressure by continuous application down to or below the regular normal pressure at which the system is intended to operate.

In speaking above of accidentally admitting a pressure to the train-line of fifteen or twenty pounds above the normal and the results that would follow in setting the brakes with the apparatus of Fig. 2 I have referred only to the ordinary or service application. If with this higher pressure in train-line and auxiliary reservoirs the usual quick reduction is made for the emergency application, the train-line pressure and the pressure above diaphragm 30 will drop so quickly that the spring 37 will close the valve 31 before the triple valve has time to move to the position to connect the ports 20 and 21, and hence there will be no premature release. Moreover, if the port 21 be placed out of line with port 20, as shown in Fig. 4, the triple valve when shifted to the emergency position cuts off communication between these ports, which is only reëstablished when the triple valve is again moved to the left at or near the position shown in Fig. 2.

Figs. 14 and 15 show a slight modification for effecting the same results as just described. The valve 7 is abandoned and the secondary slide 105 itself is made to perform the graduation function. The arrangements of the two cavities on the face of the main slide and the two ports 20 and 21 is intended to be essentially the same as that shown in Fig. 13. In Fig. 12 the section shows ports 21, 109, and cavity 107 in full lines and ports 19 and 20 in dotted lines. In Fig. 14 ports and cavity 19 20 24 appear in full lines. When the triple valve is actuated to apply the brakes, the cavity 110 on the face of the valve (seen in Fig. 15) moves to the right of the port 108, and therefore closes communication between ports 20 and 21, the ports 106, 25, and 19 registering. As the reservoir-pressure in flowing to the brake-cylinder decreases, so as to permit the piston 4 to move to the left and close the graduating-port 25 in the main valve, the cavity 110 being a little wider in Fig. 14 than in Fig. 12 places the two ports 108 and 109 (seen in Fig. 13) in communication by the same movement of the slide 105 by which the graduating-port 25 in the main slide is closed. I have made the cavity 110 wider in Fig. 14 than in Fig. 12 merely for the purpose of showing that it may, if desired, be constructed to operate as just described. It will be seen that the piston 4 has not yet moved far enough to the left to open the recharging-ports 11 to the train-pipe; but this further movement will still keep the cavity 110 in the secondary slide above the ports 108 and 109. It is evident that if the cavity 110 in the secondary slide were made as narrow as the same cavity in Fig. 12 the slide would have to be moved farther to the left before the cavity stood above the port 108, thereby permitting the piston to open the recharging-ports 11 by the same movement. The small port 111 (shown in Fig. 15) is for the purpose of registering with the port 109, leading into the cavity 107 on the under face of the main valve when the triple valve is moved to position for setting the brakes. It may be used, if desired. It will keep the ports and passages 21 92 91, &c., charged with compressed air while the triple valve is in brake-setting position, and thus prevent any leakage from those cavities causing a premature release of the brakes.

Fig. 16 will be readily understood from a comparison with Fig. 10. In the mechanism heretofore described I have proposed to operate the release-diaphragm 30 by fluid-pressure at a definite number of pounds per square inch, to be determined by the tension of the spring 37, the opposite side of the diaphragm being of course exposed to atmospheric pressure. In Fig. 16 the same general arrangement of mechanism is illustrated, excepting that a small charging-port 57 is made through the diaphragm 30, which permits air to charge gradually into the chamber or reservoir 58. The spring 59 is made very much lighter than the spring 37 in Fig. 10. With this construction there is the same pressure of compressed air normally above and below the diaphragm 30. The valve 31 is therefore held to its seat by the force of the spring 59. When the brakes are set and air is admitted into the train-pipe and chamber 34 in the recharging, it is to be admitted only as rapidly as it can flow through the port 57 and equalize in the chamber 58, which of course may be of any desired size. When it is desired to release with this construction, the air must be admitted to the train-pipe rapidly enough to cause sufficient preponderance of pressure in the chamber 34 above the diaphragm 30 over that below the diaphragm in reservoir 58 to overcome the force of the spring 59, move the diaphragm downward, and open the valve 31. When the valve 31 is opened, the same result follows as follows the opening of the corresponding valve 31 in the other figures of the drawings. With this construction it would evidently require a sudden and rapid charging of air into the train-pipe to effect the release on a train of cars of considerable length, whereas with the construction shown in the other figures no matter how long a time is required nor how slowly the air is charged into the train-line the release will be effected when the pressure against the diaphragm 30 has been raised sufficiently to overcome the force of the spring 37 and open the valve 31.

I claim—

1. In an automatic fluid-pressure brake system, as a means for assisting in the release of the brakes, a passage or cavity, an exhaust-port and a valve moved through a reduction of train-pipe pressure into position for setting the brakes, for venting the pressure in said passage while in said position through the exhaust-port.

2. In an automatic fluid-pressure brake system, as a means for assisting in the release of the brakes, a passage or cavity, an exhaust-port and a triple valve moved through a reduction of train-pipe pressure into position for venting the pressure in the passage through the exhaust-port and moved through an increase of train-pipe pressure to disconnect said passage and exhaust-port.

3. In an automatic fluid-pressure brake system, as a means for assisting in the release of the brakes, the combination of a release-passage from a brake-cylinder, a cavity and a reciprocating valve for controlling said passage and cavity, which is moved through a reduction of train-pipe pressure into position for closing the release-passage and venting the pressure from said cavity, and through an increase of train-pipe pressure to open the release-passage and close said cavity.

4. In an automatic fluid-pressure brake system, as a means for assisting in the release of the brakes, the combination of a release-passage from a brake-cylinder, a cavity normally containing fluid-pressure, and a triple valve shifted in one direction for admitting pressure to the brake-cylinder and releasing pressure from said cavity and shifted in the other direction for releasing pressure from the brake-cylinder and admitting pressure to said cavity.

5. In an automatic fluid-pressure brake system, the combination of a primary piston, a secondary valve device actuated through an increase of fluid-pressure, independently of the movement of the primary piston, for controlling the movement of the primary piston, a passage for causing variation of pressure on the primary piston, a release-passage from a brake-cylinder and a valve operated by the primary piston for controlling both of said passages.

6. In an automatic fluid-pressure brake system, the combination of a primary piston for controlling by its movement the release of pressure from a brake-cylinder, a secondary valve device actuated by an increase of fluid-pressure, independently of the movement of the primary piston, a passage controlled by said secondary valve device for causing variation of pressure on said primary piston, and a valve operated by reduction of train-pipe pressure to vent the pressure from said passage and moved by the primary piston to close the same.

7. In an automatic fluid-pressure brake system, the combination, with the main valve of a triple valve controlling a release-passage from a brake-cylinder, of a primary piston for controlling the movement of said valve to release position, a secondary valve device actuated through an increase of fluid-pressure, independently of the movement of said primary piston, a passage controlled by said secondary valve device for varying the pressure on the primary piston which is alternately opened and closed by said main valve while the said release-passage is alternately closed and opened.

8. In an automatic fluid-pressure brake system, as a means for insuring the release of the brakes, the combination of a valve for controlling by its operation the ultimate movement of the triple valve to release position, a piston or diaphragm actuated by an increase of fluid-pressure for controlling said valve and means for controlling said piston and limiting its operation to a predetermined, definite pressure per square inch.

9. In an automatic fluid-pressure brake system, the combination, with a train-pipe and a triple valve, of a valve device on the car, which is actuated by a predetermined definite pressure per square inch, for controlling by its operation the ultimate movement of the triple valve to release position, a second valve device on the locomotive for controlling the admission of pressure to the train-pipe and means for regulating the second valve device, whereby in one adjustment thereof the pressure admitted to the train-pipe will be insufficient, and in another adjustment thereof said pressure will be sufficient, to operate the first-mentioned valve device to move the triple valve to release.

10. In an automatic fluid-pressure brake system, the combination of a valve controlling a release-passage from a brake-cylinder, a primary piston controlling said valve, a passage for venting the pressure from one side of said primary piston, a secondary piston for controlling by its operations said passage and a valve device operated by an increase of fluid-pressure, independently of the movement of said primary piston, for controlling the operation of said secondary piston.

11. In an automatic fluid-pressure brake system, the combination of a valve controlling a release-passage from a brake-cylinder, a primary piston for controlling said valve, passages for supplying pressure to and venting it from one side of said primary piston, valves controlling said passages, a secondary piston for controlling the last-mentioned valves and a valve device actuated by an increase of fluid-pressure, independently of the movement of said primary piston, for controlling the movement of said secondary piston.

12. In an automatic fluid-pressure brake system, the combination of a release-passage from a brake-cylinder, a passage or cavity normally containing fluid under pressure, an exhaust-port, a valve moved through a reduction of train-pipe pressure for closing said release-passage and controlling said cavity, a secondary valve and a passage for alternately closing and opening said cavity to said exhaust-port which is controlled by both the primary and secondary valves.

13. In an automatic fluid-pressure brake system, the combination in a triple-valve device of a piston, a main valve, and a secondary valve, both operated by said piston, a passage or cavity normally containing fluid under pressure, a passage for alternately opening and closing said cavity to exhaust and ports controlled by said primary and secondary valves, whereby said cavity is opened to exhaust through said two valves moving in opposite directions and is closed through said valves moving in the same direction.

14. In an automatic fluid-pressure brake system, the combination with a triple valve of three passages leading from a common source, first to the auxiliary reservoir, second to the triple-valve chamber, and third to exhaust, and a valve device actuated by a variation of fluid-pressure for placing the second of these passages alternately in communication with the first and the third.

15. In an automatic fluid-pressure brake system, the combination with a triple valve, of a recharging-passage for charging air from train-pipe to the auxiliary reservoir while the triple valve is in position for setting brakes, three passages leading from a common source first, to the reservoir, second to the triple-valve chamber, and, third, to exhaust, and a supplemental valve device actuated through an increase of fluid-pressure for closing the second of these passages to the first and opening it to the third.

16. In an automatic fluid-pressure brake system, the combination of a primary piston, a secondary valve device actuated through an increase of fluid-pressure, independently of the movement of the primary piston, for controlling the movement of the primary piston, a passage for causing variation of pressure on the primary piston, a release-passage from a brake-cylinder and a valve operated by the primary piston for controlling both of said passages, together with a passage for recharging the auxiliary reservoir of the system from the train-pipe while said valve remains in position to close said release-passage.

17. In an automatic fluid-pressure brake system, the combination, with the main valve of a triple valve controlling a release-passage from a brake-cylinder, of a primary piston for controlling the movement of said valve to release position, a secondary valve device actuated through an increase of fluid-pressure, independently of the movement of said primary piston, a passage controlled by said secondary valve device for varying the pressure on the primary piston which is alternately opened and closed by said main valve while the said release-passage is alternately closed and opened, together with a passage for recharging the auxiliary reservoir of the system from the train-pipe while the triple valve remains in position to close said release-passage.

MURRAY CORRINGTON.

Witnesses:
T. BLAIR SHOEMAKER,
H. L. OSGOOD.